United States Patent [19]

Burkholder et al.

[11] Patent Number: 4,855,164
[45] Date of Patent: Aug. 8, 1989

[54] STABLE MULTIPHASE COATING COMPOSITIONS

[75] Inventors: Mary J. Burkholder, Mars; Barbara G. Piccirilli, Gibsonia; Carl C. Anderson, Allison Park; Rodger G. Temple, Gibsonia, all of Pa.

[73] Assignee: PPG Industries, Inc., Pittsburgh, Pa.

[21] Appl. No.: 155,458

[22] Filed: Feb. 12, 1988

[51] Int. Cl.$^4$ ................................................ B05D 3/02
[52] U.S. Cl. ........................... 427/385.5; 427/388.4; 427/388.5; 524/475; 524/500; 524/507; 524/513; 524/514; 524/538; 524/539
[58] Field of Search ............... 427/388.8, 388.4, 388.5; 524/475, 500, 507, 513, 514, 538, 539

[56] References Cited

U.S. PATENT DOCUMENTS

| | | | |
|---|---|---|---|
| 4,009,136 | 2/1977 | Lewandowski et al. | 260/29.6 RB |
| 4,530,946 | 7/1985 | Kanda et al. | 524/513 X |
| 4,546,014 | 10/1985 | Gajira et al. | 524/513 X |
| 4,717,620 | 1/1988 | Bowen et al. | 428/323 |
| 4,731,409 | 3/1988 | Miwa et al. | 514/513 X |

FOREIGN PATENT DOCUMENTS

| | | |
|---|---|---|
| 62-155973 | 7/1987 | Japan . |
| 141939 | 7/1978 | Norway . |

OTHER PUBLICATIONS

T. A. Shitova, V. V. Verkholantsev, I. S. Okhrimenko, "Multicolor Aqueous Construction Paints", Nov. Lakokras. Mater., Ne Soderzh. Org. Rastvoritelei, Mater. Kratkosrochnomu Semin. 18–21, Leningr. Dom Nauchno–Tekh. Propag. Leningrad, USSR (English language translation).
Product Literature from Rossetti S.P.A. Vernici e idee for Paratone.
Product literature from Chem-Plast S.p.A. for Combicromat ®.

Primary Examiner—Michael Lusignan
Attorney, Agent, or Firm—Linda Pingitore

[57] ABSTRACT

A coating composition contains:
(a) a waterborne film-forming polymer; and
(b) a stable, liquid nonaqueous polymer microparticle dispersion characterized in that the nonaqueous dispersion, when independently spray applied, is capable of forming discrete, particle agglomerates upon volatilization of its nonaqueous medium, the components (a) and (b) being present in amounts effective to provide that the coating composition is a stable, multiphase composition.

42 Claims, No Drawings

STABLE MULTIPHASE COATING COMPOSITIONS

CROSS REFERENCE TO RELATED APPLICATIONS

This application is related to Ser. No. 128,316, entitled "METHOD FOR PREPARING STABLY DISPERSED NONAQUEOUS MICROPARTICLE DISPERSION", filed on Dec. 3, 1987; Ser. No. 128,353, entitled "STABLE NONAQUEOUS POLYURETHANE MICROPARTICLE DISPERSION", filed on Dec. 3, 1987; and Ser. No. 128,315, entitled "STABLE NONAQUEOUS MICROPARTICLE DISPERSIONS PREPARED FROM AMINOPLAST RESINS", filed on Dec. 3, 1987.

BACKGROUND OF THE INVENTION

The present invention relates to coating compositions which, when applied to a substrate, result in a textured appearance.

In a variety of applications the use of various fabrics such as suede, velour, or velvet to achieve a soft, piled textured appearance is desirable from an aesthetic viewpoint but impractical from the standpoint of durability, cleanability, ease of design or construction and cost. Examples of such applications include automobile dashboards; the interior roof parts of an automobile; automobile upholstery as well as a variety of other upholstered items; room ceilings and partitions and other interior design applications where the "look" and "feel" of fabric is desired but not the actual use of fabric.

There is a need, therefore, for a way to achieve the aesthetic advantages of a piled, textured appearance without the use of fabrics or carpeting.

SUMMARY OF THE INVENTION

In accordance with the present invention, there is provided a coating composition comprising: a waterborne film-forming polymer; and an independently agglomerateable dispersed polymer in a nonaqueous medium which is adapted to provide a textured surface upon spray application onto a substrate, the waterborne film-forming polymer and the independently agglomerateable dispersed polymer being present in amounts effective to provide that the coating composition is a stable, multiphase composition. A preferred coating composition according to the present invention comprises:

(a) a waterborne film-forming polymer; and
(b) a stable, liquid nonaqueous polymer microparticle dispersion characterized in that the nonaqueous dispersion when independently spray applied is capable of forming discrete particle agglomerates upon volatilization of its nonaqueous medium, the components (a) and (b) being present in amounts effective to provide that the coating composition is a stable, multiphase composition.

Also provided in accordance with the present invention is a method of preparing a coated article having a piled texture comprising:

(a) applying to a substrate a coating composition comprising:
  (i) a waterborne film-forming polymer;
  (ii) a stable, liquid nonaqueous polymer microparticle dispersion characterized in that the nonaqueous dispersion when independently applied is capable of forming discrete particle agglomerates upon volatilization of its nonaqueous medium; and (b) allowing the coating composition to dry.

DETAILED DESCRIPTION OF THE INVENTION

The stable multiphase coating composition of the present invention comprises as a principle component a waterborne film forming polymer.

The waterborne film-forming polymer can be selected from a wide variety of materials including acrylic emulsion polymers, vinyl chloride polymers, vinylidene chloride polymers, vinyl acetate polymers, aqueous polyurethane polymers, and water reducible polymers such as polyester polymers. The preparation of these different types of polymers is well appreciated by those skilled in the art of polymer chemistry. If a detailed discussion is desired, see Golding, *Polymers and Resins*, D. VanNostrand Company, Inc. 1959; Oil and Colour Chemists' Association, *Surface Coatings*, Chapman and Hall Ltd., 1983; Craver and Tess, *Applied Polymer Science*, American Chemical Society, Division of Organic Coatings and Plastics Chemistry, 1975; Dietrich, "Aqueous Emulsions, Dispersions and Solutions of Polyurethanes; Synthesis and Properties", *Progress in Organic Coatings*, Vol. 9, pges 281–340, Elseview, Sequoia S. S. Lausanne, 1981; and Barrett, *Dispersion Polymerization in Organic Media*, John Wiley and Sons, New York, 1975.

The aqueous based acrylic emulsion polymers can be prepared in accordance with conventional methods of emulsion polymerization. For a detailed discussion of aqueous emulsion polymerization see D. Blackley, *Emulsion Polymerization, Theory and Practice*, John Wiley and Sons, New York, 1975.

Preferably, the waterborne film-forming polymer is an aqueous polyurethane polymer.

The waterborne film-forming polymer is present in the claimed multiphase coating composition in an amount ranging from about 10 percent to about 80 percent, the percentages based on the resin solids of the composition. Preferably the waterborne film-forming polymer is present in an amount ranging from about 20 percent to about 50 percent and more preferably from about 25 percent to about 40 percent, based on the resin solids of the composition.

The second principle component of the claimed stable multiphase coating composition is an independently agglomeratable dispersed polymer in a nonaqueous medium which is adapted to provide a textured surface upon spray application onto a substrate.

The expression "stable multiphase" means that the aqueous phase and the nonaqueous phase are adapted such that when they are mixed the phase which is the dispersed phase forms droplets in the phase which is the continuous phase, the droplets ranging in size from about 1 micron to about 100 microns, as determined by microscopic analysis. By "stable" is meant that, upon storage, the coating composition does not exhibit substantial phase separation. Some minor separation can occur however the phases can readily be redistributed with mild agitation.

For the purposes of the present application the expression "aqueous phase" means the waterborne film-forming polymer together with its medium (water). The expression "nonaqueous phase" means the dispersed polymer together with its nonaqueous medium.

It should be understood that the coating composition can be prepared such that either the aqueous phase or the nonaqueous phase can be the continuous phase or the dispersed phase of the total composition. Thus one can prepare a stable multiphase composition in which the aqueous phase is the dispersed phase which forms droplets in the nonaqueous phase as the continuous phase. Alternatively, the nonaqueous phase can be the dispersed phase which forms droplets in the aqueous phase as the continuous phase. In a preferred embodiment of the claimed invention the aqueous phase is the dispersed phase and the nonaqueous phase is the continuous phase.

The expression "textured" means that there are present particle agglomerates ranging in size from about 0.05 millimeters to about 1.5 millimeters which can be distributed in relation to each other such that they can be as far apart as approximately 25 millimeters or close together so that they form agglomerate clusters or flocs.

For the purposes of this application, a particle "agglomerate" is a combination of two or more polymer microparticles into a cluster or clusters of increasing size.

For the purposes of determining whether the dispersed polymer is independently agglomerateable and adapted to provide a textured surface, the "spray application" is performed using a Binks® model 62 spray gun with siphon feed, 66SD air cap, 365 needle and 55 pounds per square inch (psi) atomizing air.

The substrate can be any substrate including metals, fabrics, plastics, wood, leather, fiberboard, ceramics and glass.

Preferably the independently agglomeratable dispersed polymer of the claimed multiphase coating composition is a stable, liquid nonaqueous polymer microparticle dispersion. The nonaqueous dispersion is characterized in that when the nonaqueous dispersion is spray applied independently of the waterborne film-forming polymer, the nonaqueous dispersion is capable of forming discrete, particle agglomerates upon volatilization of the nonaqueous medium. For this determination the spray application is carried out under the spray conditions set out above.

It should be understood that a wide variety of nonaqueous polymer microparticle dispersions can be utilized in the present invention so long as the nonaqueous dispersion is one which is capable of forming discrete, particle agglomerates upon volatilization of its nonaqueous medium when independently spray applied. The nonaqueous medium provides the continuous phase of the emulsion or dispersion in which the microparticles are suspended. The nonaqueous medium is one which is inert to the reactants and preferably is non-polar. A wide variety of organic solvents can be utilized. Preferably, a major amount of the nonaqueous medium is made up of an aliphatic solvent or mixture of aliphatic solvents. Examples of suitable nonaqueous media are hydrocarbons such as acyclic aliphatic hydrocarbons having from 4 to 30 carbon atoms and which are saturated such as n-pentane, n-hexane, n-heptane and n-octane; and cyclic hydrocarbons such cyclohexane and methyl cyclohexane. Also, minor amounts of aromatic hydrocarbons such as xylene and toluene as well as other solvents including ketone solvents and ester solvents can be present. The preferred media are the acyclic aliphatic hydrocarbons. The liquid hydrocarbon may be a mixture of such materials and would include such commercially available products as mineral spirits and solvent naphtha.

In one preferred embodiment the nonaqueous medium is essentially free of solvents with a high boiling point, i.e., slow solvents, such as N-methyl-2-pyrrolidone.

Examples of suitable nonaqueous microparticle dispersions include polyurethane microparticle dispersions such as those disclosed in U.S. Pat. No. 3,917,741 to McGarr and U.S. Pat. No. 3,787,525 to McGarr; acrylic microparticle dispersions, polyester microparticle dispersions, polyamide microparticle dispersions as well as others all of which are described in detail in Barrett, *Dispersion Polymerization in Organic Media,* New York, John Wiley and Sons, 1975, pages 201 to 241.

The stable multiphase coating compositions of the present invention can be pigmented in various colors and in such embodiments additionally contain a pigment grind paste. The grind paste generally includes a resinous vehicle, pigments, any solvents or water and other optional additive compounds. The resinous vehicle can be selected from a variety of resinous materials such as, for example, polyesters, polyurethanes or acrylic resins. As well as being prepared in solid matte colors the claimed coating compositions can be prepared as speckled, multicolored compositions. In such embodiments it is preferred that the grind paste be appreciably insoluble in both the aqueous and nonaqueous phases of the multiphase composition.

Preferably the nonaqueous microparticle dispersion is a stable, nonaqueous polyurethane microparticle dispersion characterized in that less than 20 percent of the microparticles have a mean diameter greater than 5 microns, further characterized in that at a total solids content of 60 percent, the viscosity is less than 1000 centipoise at 25° C. The polyurethane is prepared from reactants which are substantially free of acrylic polymer and the polyurethane is further characterized in that it is substantially free of unreacted polyisocyanate monomer. In a preferred embodiment of the claimed invention, the stable multiphase coating composition comprises an aqueous polyurethane film-forming polymer as the waterborne polymer and the stable nonaqueous polyurethane microparticle dispersion set forth above as the nonaqueous dispersion.

In a further preferred aspect of the claimed invention, the stable multiphase coating composition comprises
(a) a waterborne film-forming polymer as has been described above; and
(b) a stable, nonaqueous microparticle dispersion prepared by a method which comprises:
  (i) mixing into a nonaqueous medium a polymerizable component at least 20 percent of which is insoluble in the nonaqueous medium, said polymerizable component comprising at least one polymerizable species;
  (ii) subjecting the mixture of (i) to stress sufficient to particulate it;
  (iii) polymerizing the polymerizable component within each particle under conditions sufficient to produce polymer microparticles stably dispersed in the nonaqueous medium, said polymer microparticles being insoluble in the nonaqueous medium and the nonaqueous medium being substantially free of dissolved polymer; the dispersion further characterized in that less than 20 percent of the polymer microparticles after polymerization have a mean diameter greater than 5 microns.

The aforesaid method for preparing polymer microparticles which are stably dispersed in a nonaqueous medium involves several steps. The first step of the method involves mixing into a nonaqueous medium a polymerizable component. The polymerizable component comprises at least one polymerizable species preferably at least two polymerizable species and moreover at least 20 percent of the polymerizable component is insoluble in the nonaqueous medium. For the purposes of the present application, the term "insoluble" means that the insoluble component is observable as a separate phase.

As has been discussed above, the nonaqueous medium of the nonaqueous microparticle dispersion provides the continuous phase of the emulsion or dispersion in which the microparticles are suspended. The materials described in detail above are also suitable for use in the preparation according to the method set out above.

If the polymerizable component is too viscous, for example a Brookfield viscosity greater than 20 poise measured at 50 RPM using a number 3 spindle at 25° C. or a Z Gardner Holdt viscosity, then a polar solvent such as N-methyl-2-pyrrolidone or acetonitrile can be used to dilute the polymerizable component. This is desirable from the standpoint that a less viscous polymerizable component requires less energy to particulate into small particles during the emulsification. However, the use of excessive amounts of polar solvents is not preferred because of the tendency of the polymerizable component to form a macrogel instead of discrete polymeric microparticles. It should be understood that the polar solvent can be inert to the reactants or it can be a reactive diluent such as, for example, N-vinyl pyrrolidone.

One can prepare the nonaqueous dispersions initially at low solids and then concentrate to high solids by distillation. In such an instance, a combination of a low boiling solvent (boiling point less than 100° C.) and higher boiling solvent (boiling point greater than 120° C.) is preferred.

As was mentioned above, at least 20 percent of the polymerizable component is insoluble in the nonaqueous medium. Generally, fewer difficulties are encountered when the majority of the polymerizable component is insoluble in the nonaqueous medium. The polymerizable component comprises at least one polymerizable species preferably at least two polymerizable species. The polymerizable species are materials which contain functionality which is capable of reacting and polymerizing to form a polymer. At least one of the reactant species and preferably all, should be insoluble in the nonaqueous medium. The reactants can be monomeric materials, oligomers or polymers. Examples of polymerizable species or reactants include active hydrogen containing materials such as, for example, polyester polyols, polyether polyols, and polyurethane polyols which are reacted with a polyisocyanate. When the polymerizable component comprises as reactants such an active hydrogen containing material and a polyisocyanate, the resultant polymer is a polyurethane microparticle dispersion. These are particularly preferred for use herein. In the present invention where the expression "polyurethane" is used, not only polyurethanes from the reaction of polyisocyanates and polyols is intended but also mixed poly(urethane-ureas) and polyureas. Also, reaction products obtained from the reaction of polyisothiocyanates with active hydrogen-containing compounds are intended. The polymerizable component can also comprise as polymerizable species an aminoplast resin reacted with a polyol such as those which have been listed above. In one embodiment a nonaqueous microparticle dispersion can be prepared by self-condensing one or more aminoplast resins. If desired water can also be added and it will react with the aminoplast during polymerization. Each of these materials is discussed in detail below. Although a variety of materials are disclosed, fewer difficulties are encountered in the claimed method of preparation when the materials chosen are insoluble in the nonaqueous medium.

In one embodiment, the polymerizable species are an amine and a polyisocyanate. The amine can be generated by the reaction of water with the polyisocyanate. The resultant product is a polyurea microparticle dispersion. The particles can be crosslinked or uncrosslinked.

Examples of polyether polyols are polyalkylene ether polyols which include those having the following structural formula:

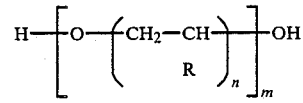

where the substituent R is hydrogen or lower alkyl containing from 1 to 5 carbon atoms including mixed substituents, and n is typically from 2 to 6 and m is from 2 to 100 or even higher. Included are poly(oxytetramethylene) glycols, poly(oxyethylene) glycols, poly(oxy-1,2-propylene) glycols and the reaction products of ethylene glycol with a mixture of 1,2-propylene oxide, ethylene oxide and alkyl glycidyl ethers.

Also useful are polyether polyols formed from oxyalkylation of various polyols, for example, glycols such as ethylene glycol, 1,6-hexanediol, Bisphenol A and the like, or other higher polyols, such as trimethylolpropane, pentaerythritol and the like. Polyols of higher functionality which can be utilized as indicated can be made, for instance, by oxyalkylation of compounds such as sorbitol or sucrose. One commonly utilized oxyalkylation method is by reacting a polyol with an alkylene oxide, for example, ethylene or propylene oxide, in the presence of an acidic or basic catalyst.

In addition to the high molecular weight polyols mentioned above, mixtures of both high molecular weight and low molecular weight polyols can be used. Among the low molecular weight polyols are diols, which are preferred, and triols such as aliphatic polyols including alkylene polyols containing from 2 to 18 carbon atoms. Examples include ethylene glycol, 1,4-butanediol, 1,6-hexanediol; cycloaliphatic polyols such as 1,2-hexanediol and cyclohexanedimethanol. Examples of triols include trimethylolpropane and trimethylolethane. Also useful are polyols containing ether linkages such as diethylene glycol and triethylene glycol.

Polyester polyols can be prepared by the polyesterification of an organic polycarboxylic acid or its functional equivalent (e.g., anhydride or ester) with organic polyols and/or an epoxide. Usually, the polycarboxylic acids and polyols are aliphatic or aromatic dibasic acids and diols.

The diols which are usually employed in making the polyester include alkylene glycols, such as ethylene glycol, neopentyl glycol and other glycols such as hydrogenated Bisphenol A, cyclohexanediol, cyclohexanedimethanol, caprolactone derived diols, for example, the reaction product of epsilon-caprolactone and ethylene glycol, hydroxy-alkylated bisphenols, polyether glycols, for example, poly(oxytetramethylene) glycol and the like. Polyols of higher functionality can also be used. Examples include trimethylolpropane, trimethylolethane, pentaerythritol and the like as well as higher molecular weight polyols such as those produced by oxyalkylating lower molecular weight polyols.

The acid component of the polyester consists primarily of monomeric carboxylic acids or anhydrides having 2 to 36 carbon atoms per molecule. Among the acids which are useful are phthalic acid, isophthalic acid, terephthalic acid, tetrahydrophthalic acid, decanedioic acid, dodecanedioic acid, and other dicarboxylic acids of varying types. The polyester may include minor amounts of monobasic acid such as benzoic acid, stearic acid, acetic acid, hydroxystearic acid and oleic acid. Also, there may be employed higher polycarboxylic acids such as trimellitic acid and tricarballylic acid. Where acids are referred to above, it is understood that anhydrides of those acids which form anhydrides can be used in place of the acid. Also, lower alkyl esters of the acids such as dimethyl glutarate and dimethyl terephthalate can be used.

Besides polyester polyols formed from polybasic acids and polyols, polylactone-type polyesters can also be employed. These products are formed from the reaction of a lactone such as epsilon-caprolactone and a polyol. The product of a lactone with an acid-containing polyol can also be used.

In addition to the aforedescribed polyols, polyurethane polyols can also be used. These polyols can be prepared by reacting any of the above-mentioned polyols with a minor amount of organic polyisocyanate (OH/NCO equivalent ratio greater than 1:1) so that terminal hydroxyl groups are present.

The organic polyisocyanate can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis(cyclohexyl isocyanate) and isophorone diisocyanate. Useful aromatic diisocyanates include the various isomers of toluene diisocyanate, meta-xylene-diisocyanate, and para-xylene-diisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used. In addition the various isomers of alpha, alpha, alpha'-tetramethyl xylene diisocyanate can be used. Also useful as the polyisocyanate are isocyanurates such as DESMODUR 3300 from Mobay and biurets of isocyanates such as DESMODUR N100 from Mobay.

Aminoplast resins are based on the addition products of formaldehyde, with amino- or amido-group carrying substance. Condensation products obtained from the reaction of alcohols and formaldehyde with melamine, urea or benzoguanamine are most common and are preferred herein. However, condensation products of other amines and amides can also be employed, for example, aldehyde condensates of triazines, diazines, triazoles, guanidines, guanamines and alkyl- and aryl-substituted derivatives of such compounds, including alkyl- and aryl-substituted melamines. Some examples of such compounds are N,N'-dimethyl urea, benzourea, dicyandiamide, formaguanamine, acetoguanamine, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diamino-pyrimidine, 3,4,6-tris(ethylamino)-1,3,5-triazine, and the like.

While the aldehyde resins contain methylol or similar alkylol groups, and in most instances at least a portion of these alkylol groups are etherified by reaction with an alcohol so long as the alcohol chosen or the degree of etherification does not yield an aminoplast resin with excessive solubility in the solvent used in the nonaqueous medium. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohols such as cyclohexanol, mono-ethers of glycols such as those sold under the trademarks CELLOSOLVE and CARBITOL, by Union Carbide and halogen-substituted or other substituted alcohols, such as 3-chloropropanol and butoxyethanol. The preferred aminoplast resins are substantially alkylated with methanol.

The proportion of each of the materials which make up the polymerizable component can vary widely depending upon the polymeric structure desired. Typically the dispersion stabilizer or dispersant which is discussed below is used in an amount of from about 5 percent by weight to about 30 percent by weight, based on the total weight of the solid generating component of the pre-emulsification mixture. The balance is polymerizable component. For the purposes of determining these percentages the solid generating component does not include the inert materials which make up the nonaqueous medium as it has been defined herein. Reactive diluents as they have been defined herein, however, are considered to be solid generating.

Once the polymerizable component has been thoroughly mixed with the nonaqueous medium, the mixture is subjected to stress in order to particulate the mixture into microparticles which are uniformly of a fine particle size. The mixture is subjected to stress sufficient to result in a dispersion such that after polymerization less than 20 percent of the polymer microparticles have a mean diameter greater than 5 microns.

The preferred mode of subjecting the mixture of polymerizable component and nonaqueous medium to the appropriate stress is by use of a MICROFLUIDIZER® emulsifier which is available from Microfluidics Corporation in Newton, Mass. The MICROFLUIDIZER® high pressure impingement emulsifier is patented in U.S. Pat. No. 4,533,254 which is incorporated herein by reference. The device consists of a high pressure (up to 20,000 psi) pump and an interaction chamber where the emulsification takes place. The pump forces the mixture of reactants in nonaqueous medium into the chamber where it is split into at least two streams which pass at a very high velocity through at least two slits and collide resulting in the particulation of the mixture into small particles. Generally, the reaction mixture is passed through the emulsifier once at a pressure between 5,000 and 15,000 psi. Multiple passes result in smaller average particle size and a narrower range for the particle size distribution. When using the aforesaid MICROFLUIDIZER ® emulsifier, stress is applied by liquid liquid impingement as has been described. However, it should be understood that if desired, other modes of applying stress to the pre-emulsification mixture can be utilized so long as sufficient stress is applied to achieve the requisite particle size distribution, that is, such that after polymerization less than 20 percent of the polymer microparticles have a mean diameter greater than 5 microns. For example, one alternative manner of applying stress would be the use of ultrasonic energy.

Stress is defined as force per unit area. Although the precise mechanism by which the MICROFLUIDIZER ® emulsifier stresses the pre-emulsification mixture to particulate it is unknown, it is theorized that stress is exerted in more than one manner. It is believed that one manner in which stress is exerted is by shear. Shear means that the force is such that one layer or plane moves parallel to an adjacent, parallel plane. Stress can also be exerted from all sides as a bulk, compression stress. In this instance stress could be exerted without any shear. A further manner of producing intense stress is by cavitation. Cavitation occurs when the pressure within a liquid is reduced enough to cause vaporization. The formation and collapse of the vapor bubbles occurs violently over short time periods and produces intense stress. Although not intending to be bound by theory, it is believed that both shear and cavitation contribute to producing the stress which particulates the pre-emulsification mixture.

Once the mixture has been particulated into microparticles, the polymerizable component within each particle is now polymerized under conditions sufficient to produce polymer microparticles which are stably dispersed in the nonaqueous medium. It should be understood that one of the requisite conditions sufficient to achieve the stably dispersed microparticles is the presence in the reaction mixture of a dispersion stabilizer also termed a dispersant. The dispersion stabilizer is preferably present when the polymerizable component is mixed into the nonaqueous medium prior to particulation. Alternatively, the dispersant can be introduced into the medium at a point just after the particulation within the MICROFLUIDIZER ® emulsifier. The dispersant, however, is an important part of the polymerizable component necessary to achieve the requisite particle stability. The stabilizer is a material whose role is to prevent the emulsified particles from agglomerating to form larger particles.

The same variety of dispersion stabilizers or dispersants which can be utilized during conventional nonaqueous emulsion polymerization are also suitable for this high stress technique. For a detailed listing of several suitable stabilizers see Dowbenko and Hart, "Nonaqueous Dispersions as Vehicles for Polymer Coatings", I&EC Product Research and Development, Vol. 12, March 1973, pages 14 to 20, copyright 1973. A preferred dispersion stabilizer is known as the comb stabilizer. The preparation of the preferred comb type graft dispersant is disclosed in U.S. Pat. No. 3,607,821 which is incorporated herein by reference.

It should be understood that in some instances it may be desirable for some of the reactant species to be added after particulation of the remaining reactants and the nonaqueous medium. These reactants can be added either before or during the polymerization. For example, in the preparation of a polyurea directly from amine and polyisocyanate or when water is used initially to react with the polyisocyanate to generate amine, it is preferred that the amine or water be added to the isocyanate functional microparticle dispersion rather than being added prior to particulation.

The particulated mixture is then subjected to conditions sufficient to induce polymerization of the polymerizable mixture within the microparticles. The particular conditions will vary depending upon the actual materials being polymerized. For example, for the reaction of aminoplasts with polyols the addition of an acid catalyst and heat is used; for the reaction of polyisocyanates and polyols a catalyst such as dibutyltin dilaurate and heat is used; for vinyl addition polymerization a free radical catalyst is utilized. For example, in the preparation of polyurethanes generally the temperature can vary from about 20° C. to about 120° C., preferably 80° C. to 100° C. The length of time required to complete polymerization typically varies from about three hours to about 12 hours. Usually, the preparation of a polyurethane microparticle dispersion requires a temperature of about 85° C. to 90° C. for a period of from about three to about five hours.

The progress of the polymerization reaction can be followed by techniques conventionally known to those skilled in the art of polymer chemistry. For example, isocyanate equivalent weight and infrared spectroscopy can be used to follow the polyurethane preparation. For a vinyl addition polymerization one can monitor solids and for an aminoplast polyol reaction one can monitor the amount of distillate being removed (typically water and alcohol and occasionally formaldehyde are removed by distillation).

Once the polymerization is complete, the resultant product is a stable dispersion of polymer microparticles in a nonaqueous medium, wherein the polymer is contained within each particle. The nonaqueous medium therefore is substantially free of dissolved polymer since it is essentially self-contained within each microparticle. The resultant polymer microparticles are of course insoluble in the nonaqueous medium. In saying that the nonaqueous medium is substantially free of dissolved polymer, it is intended that the term "substantially free" means that the nonaqueous medium contains no more than 30 percent by weight of dissolved polymer, preferably no more than 15 percent.

By "stably dispersed" is meant that the polymer microparticles do not settle upon standing and do not coagulate or flocculate on standing. Typically, when diluted to 50 percent total solids the claimed dispersions do not settle even when aged for one month at room temperature As was stated above, a very important aspect of the polymer microparticle dispersions which are prepared by the method set forth above is that the particle size is uniformly small, i.e., after polymerization less than 20 percent of the polymer microparticles have a mean diameter which is greater than 5 microns, more preferably greater than 1 micron. Preferably the mean diameter of the particles after polymerization ranges from about 0.05 microns to about 0.5 microns. The particle size can be measured with a particle size analyzer such as the Coulter N4 instrument commercially available from Coulter. The instrument comes with detailed instructions for making the particle size measurements. However, briefly, a sample of the nonaqueous dispersion is diluted with heptane until the sample concentration falls within specified limits required by the instrument. The measurement time is 10 minutes. Moreover, generally the microparticle dispersions are characterized by the property that in the absence of a polar solvent, when at a solids content of 40 percent, the Brookfield viscosity is less than 100 centipoise measured at 50 RPM using a number 3 spindle at 25° C. In a preferred embodiment when one is preparing a polyurethane, when at a solids content of 60 percent the Brookfield viscosity is less than 1,000 centipoise measured at 50 RPM using a number 3 spindle at 25° C.

It should be understood that the aforedescribed nonaqueous polymer microparticle dispersions prepared by the method above can be thixotropic. That is, their viscosity can increase if they are allowed to stand undisturbed. However, upon application of sufficient high shear for a period of time the viscosity will be decreased.

The microparticle dispersions of the aforedescribed method are high solids materials of low viscosity. Dispersions can be prepared directly with a total solids content of from about 45 percent to about 60 percent. They can also be prepared at a lower solids level of about 30 to about 40 percent total solids and concentrated to a higher level of solids of about 55 to about 75 percent by stripping. This can even be done during the polymerization. The molecular weight and viscosity of the claimed nonaqueous dispersions are independent of each other. The weight average molecular weight can range from a few hundred to greater than 100,000. The Brookfield viscosity can also vary widely from about one poise to about 100 poise, preferably from about 1 to about 5 poise when measured at 25° C. using a number 3 spindle at 50 RPM.

The microparticle dispersions can be either crosslinked or uncrosslinked. When uncrosslinked the polymer within the microparticles can be either linear or branched.

In the preparation of polyurethanes by the aforedescribed method, the use of difunctional polyisocyanates and active hydrogen containing materials results in linear materials. The incorporation of materials of higher functionality leads to branching and/or crosslinking. As is appreciated by those skilled in polymer chemistry, the ratio of the reactants determines the molecular weight, degree of branching and degree of crosslinking.

The stable, liquid nonaqueous microparticle dispersion can be utilized in the claimed multiphase coating composition in an amount ranging from about 20 percent to about 80 percent, preferably from about 60 percent to about 75 percent, the percentages based on the resin solids of the composition.

As has been mentioned above, the multiphase coating compositions of the claimed invention are stable compositions, that is, upon storage the coating composition does not exhibit substantial phase separation. Although some very minor phase separation can occur, the phases can be readily redistributed with agitation.

The stable multiphase coating compositions of the claimed invention can include a number of optional additive components which are known to those skilled in the art of polymer chemistry including waxes, silicones, antistatic agents, pigments of various types including mica, titanium dioxide and also metallic pigments such as aluminum flake.

It should be understood that the claimed stable multiphase coating compositions can also contain other monomeric and polymeric materials so long as they do not detrimentally affect the properties of the ultimate coating. The monomeric or polymeric materials can be reactive or nonreactive and are typically soluble in either the aqueous phase, the nonaqueous phase or both phases of the composition. Further, the materials can be present in either phase of the composition. Examples of suitable materials include but are not limited to aminoplast resins, blocked polyisocyanates and alkyds.

In accordance with the present invention there is also provided a method of preparing a coated article having a piled texture. The method includes the steps:
  (a) applying to a substrate a stable, multiphase coating composition as has been detailed above; and
  (b) allowing the coating composition to dry.

For the purposes of the present application, to "dry" means that the waterborne film-forming polymer coalesces while the agglomerateable polymer remains as discrete particle agglomerates. In one embodiment of the claimed method, a waterborne clear coating composition is applied over the texture imparting coating composition of step (a). The clear coating composition can be applied over the multiphase composition either wet-on-wet or wet-on-dry. The waterborne clear coating composition can be selected from a variety of clear compositions which are conventionally known and available. In a preferred embodiment an aqueous polyurethane clear composition is used.

As was referred to above, the texture imparting coating composition can be formulated so as to result in a solid matte color or, alternatively, the texture imparting coating composition can be formulated as a multicolored speckled composition. When a speckled composition is desired, it is preferred that the composition be mixed in the following manner in order to achieve the speckled pattern. For each color of the multicolored speckled pattern, a corresponding tint base is separately combined with an aliquot or portion of the nonaqueous dispersion of the texture imparting coating composition and then subsequently each of the individually tinted aliquots is combined together to produce the multicolored speckled composition. The composition is then applied as desired. Although not necessary, in some instances it is desirable to apply a waterborne, pigmented basecoating composition to the substrate prior to application of the stable multiphase coating composition of step (a). This waterborne basecoating composition can be selected from a wide variety of compositions as has been discussed in detail above in connection with the texture imparting multiphase coating composition. Preferably the waterborne basecoating composition is based on an aqueous polyurethane dispersion.

The stable multiphase coating compositions of the claimed invention are advantageous for a number of reasons. The coating composition, upon drying can provide a coherent mar resistant film which is quite resistant to abrasion. Preferably, a coherent film having a Taber Abrasion resistance of 100 wear cycles per mil using a CS-10 abrasive wheel with a 500 gram weight according to ASTM D4060-84 is achieved. The claimed coating compositions result in films which have good water scrub and cleanability, that is, removal of most dirt can be achieved with no change in color, texture or appearance of the coating and good stain resistance to most common stains, such as soft drinks, coffee, ammonia containing cleaners and ketchup. Water immersion resistance is also quite good and in addition resistance to some solvents can be achieved without staining or apparent film defects.

The claimed multiphase coating compositions are preferably spray applied, although other modes of application can be utilized if desired. For spray application both air reciprocator and air assisted airless spray techniques can be used. For a high pile, textured surface air assisted application is preferred in conjunction with the use of fast solvents such as the aliphatic solvent sold as ISOPAR E from Exxon. The coating compositions can be air dried to a tack free film in approximately 1 to 2 hours and then achieve full properties after about 24 hours. Alternatively, the compositions can be baked at temperatures of typically from about 100° F. (38° C.) to about 325° F. (163° C.) for a period of from about 5 minutes to about 3 hours. When it is desired to apply a waterborne basecoat prior to application of the texture imparting multiphase coating composition, generally the waterborne basecoat is applied and permitted to dry for a period of approximately 1 to 5 minutes, followed by application of the texture imparting multiphase coating composition. The coated substrate is then allowed to air dry or, alternatively, it can be baked at temperatures of up to approximately 325° F. (163° C.).

The following examples are intended to be illustrative of the invention and are not intended to be limiting.

EXAMPLE I

In this example a coated substrate was prepared having a piled texture and speckled appearance.

The white basecoating composition which had a total solids content of 35 percent was prepared in the following manner:

| Ingredients | Parts by Weight (grams) |
| --- | --- |
| aqueous polyurethane[1] | 96.9 |
| BYK 020[2] | 0.4 |
| PERGOPAK M-3[3] | 2.6 |
| ethyleneglycol monobutyl ether | 15.0 |
| deionized water | 15.0 |
| titanium dioxide pigment paste[4] | 100.0 |

[1] This aqueous polyurethane had a total solids content of 29.88 percent measured in a mixture of 85.32 percent deionized water, 13.06 percent N—methyl-2-pyrrolidone and 1.62 percent dimethylethanolamine; a Brookfield viscosity of 335 centipoise measured at 100 RPM using a number 3 spindle; a theoretical acid value of 8.7 and a pH of 7.89. It was prepared from
67.97
percent of a polymer prepared from 89.64 percent epsilon caprolactone, 8.49 percent dimethylolpropionic acid, 1.77 percent diethylene glycol and 0.10 percent triphenylphosphite;
2.04 percent dimethylolpropionic acid; 27.76 percent of dicyclohexyl methane-4,4'-diisocyanate; 0.03 percent dibutyltin dilaurate and 2.20 percent ethylenediamine.

[2] This defoamer is commercially available from BYK Mallinckrodt.

[3] This flatting agent is commercially available from Lonza, Inc.

[4] This pigment paste was prepared in the following manner:
A premix was prepared from the following ingredients:
5 grams diethylene glycol monobutyl ether
5 grams ethylene glycol monohexyl ether
19 grams deionized water
50 grams titanium dioxide
36 grams of an aqueous polyurethane dispersion which had a total solids content of 33 percent, a solvent content of 67 percent and an acid value of 10.6. It was prepared from:
40.72 percent methylene bis(4-cyclohexyl isocyanate) commercially available from Mobay as HYLENE W.
27.30 percent of a polyester polyol having a number average molecular weight of 2000, a hydroxyl number of 56 and is commercially available from Witco as FORMREZ 55-56.
22.39 percent of a polyether polyol having a number average molecular weight of 2000, a hydroxyl number of 56 and is commercially available from Quaker Oats as POLYMEG 2000.
9.16 percent dimethylolpropionic acid
3.11 percent of ethylene diamine
1.26 percent hydroxyethyl ethyleneimine
0.49 percent neopentyl glycol
0.44 percent butanol and
0.04 percent dibutyltin dilaurate.
The solvent content was made up of 2.88 percent dimethylethanolamine; 15.10 N—methyl-2-pyrrolidone and 82.02 percent deionized water. The pH was 8.8, the milliequivalents of acid per gram of dispersion was 0.190 and the milliequivalents of base per gram of dispersion was 0.259.
The premix was ground to a Hegman grind of 7.5 using ceramic beads and then letdown with 5 grams of deionized water.

The light grey speckled texture imparting multiphase coating composition which had a total solids content of 41 percent was formulated in the following manner:

| Ingredients | Parts by Weight (grams) |
| --- | --- |
| nonaqueous polyurethane[5] microparticle dispersion | 55.0 |
| titanium dioxide pigment[6] paste | 2.5 |
| carbon black pigment paste[7] | 1.5 |
| aqueous polyurethane of footnote (1) | 45.0 |
| polyethylene wax[8] | 6.0 |
| ISOPAR E[9] | 10.0 |

[5] This nonaqueous polyurethane microparticle dispersion was prepared in the following manner:
The following ingredients were mixed together to form a solution:

| Ingredients | Parts by Weight (grams) |
| --- | --- |
| FORMREZ 55-56 | 1000 |
| 1,4-butane diol | 180 |
| trimethylhexamethylene diisocyanate | 642 |
| dispersant[a] | 512 |
| acetonitrile | 200 |

A mixture was formed by adding the above solution, while stirring, to 4,000 grams of a solvent mixture consisting of one part of ISOPAR E and three parts of heptane (boiling range 94° C. to 98° C.). The mixture was then passed through a MICROFLUIDIZER ® M-110 emulsifier at 9,000 psi and 2 grams of dibutyltin diacetate and 20 grams of triethyl amine were added to the emulsion. After heating the emulsion for 8 hours at 70° C., the infrared spectrum of a sample of the mixture indicated the presence of isocyanate. The temperature was held at 70° C. while 50 grams of a mixture of 4 parts of propylene glycol monomethyl ether acetate and one part of ethylenediamine was added, dropwise, over a period of two hours. After the infrared spectrum of a sample indicated that all of the isocyanate had reacted, the solvent was distilled under vacuum until a final solids content of 59.7 percent was achieved. The Brookfield viscosity at 50 RPM using a number 2 spindle was 232 centipoise. The particle size was 2610 angstroms.
[a]This dispersant is a comb type stabilizer and is prepared as set out below:
The preparation of the comb type stabilizer is done in two steps.
Step A: Synthesis of poly(12-hydroxystearyl) methacrylate:
A five liter round bottom flask was charged with 444.5 g of toluene and 100 g of 12-hydroxystearic acid. The solution was heated at 85° C. while 2420 g of solid 12-hydroxystearic acid was added slowly enough to allow the mixture to be stirred as the solid melted and dissolved. After a homogenous solution was obtained, 5.04 g of methanesulfonic acid was added and the mixture was heated to reflux (136° C. to 147° C.) while the water produced during the reaction was collected in a Dean Stark trap. When the acid value reached 30, the mixture was allowed to cool to 125°.

-continued

After first adding 2.52 g of IONOL (2,6-ditertiary-butyl para-cresol from Shell Chemical Company) dissolved in 2.52 g of toluene and 11.5 g of VM + P naphtha, 304.5 g of glycidyl methacrylate and 10.1 g of dimethylcocoamine were added. The resulting solution was then heated at reflux (149° C.) until the acid value dropped to 0.1.

Step B: Copolymerization of poly(12-hydroxystearyl) methacrylate with acrylic monomers:

A five liter round bottom flask charged with 421 g of toluene was heated at reflux while the following two solutions were added simultaneously over a three hour period.

Monomer
  958 g poly(12-hydroxystearyl) methacrylate of Part A
  710 g methyl methacrylate
  64 g glycidyl methacrylate
  16 g methacrylic acid
  721 g VM + P naphtha Initiator
  28 g 2,2'-azobis(2-methylbutanenitrile) VAZO-67 from E. I. DuPont deNemours
  250 g toluene.

When the additions were complete, 3.2 g of VAZO-67 dissolved in 50 g of toluene was added over a one hour period. The solution was held at reflux for one or more hour before cooling.

(6) This pigment paste was prepared as detailed below:
A premix was first prepared from 367.09 grams of an acrylic polyol (prepared from 10 percent 2-hydroxyethyl acrylate; 2.5 percent methacrylic acid, 25 percent of which was reacted with hydroxyethyl ethyleneimine; 30 percent styrene; 20 percent 2-ethyl hexyl acrylate; 19.5 percent butyl acrylate and 18 percent methyl methacrylate. The polyol was prepared at 52 percent solids in a mixture of 67.5 percent naphthalite, 21.7 percent isobutanol and 10.8 percent toluene) and 134.67 grams of butyl acetate. To this premix was added with agitation 1045.66 grams of carbon black and 13.06 grams of polyethylene wax which was heated prior to addition. The mixture was ground with ceramic beads to a Hegman grind of 7.5. The paste was letdown with a mixture of:
37.10 percent naphtha
12.78 percent isobutyl alcohol
5.91 percent toluene and
2.43 percent xylene.

(7) This carbon black pigment paste was prepared as detailed below:
A premix was prepared from: 492.27 grams of the acrylic polyol set forth in footnote (6) and 141.21 grams of butyl acetate. This mixture was dispersed using a Cowles disperser for 4 hours followed by the addition of 62.76 grams of carbon black and 1.56 parts of polyethylene wax which was heated prior to addition. The mixture was ground to a Hegman grind of 8 using ceramic beads. The paste was let down with a mixture of 37.10 percent naphtha, 12.78 percent isobutyl alcohol, 5.91 percent toluene and 2.43 percent xylene.

(8) This polyethylene wax is commercially available from Daniel Products Company as SL 530.

(9) This aliphatic solvent having a boiling range between 116° C. and 138° C. is commercially available from Exxon.

The coated substrate was prepared by first spray applying the basecoating composition to a metal panel which had been primed with a primer coating composition commercially available from PPG Industries, Inc., under the trademark UNI-PRIME ®.

The piled, speckled texture imparting coating composition was then spray applied and the coated panel was then baked for 20 minutes at 250° F. (121° C.). The resultant coated substrate had a piled texture and a light grey speckled appearance.

EXAMPLE II

In this example, a coated substrate was prepared having a piled texture and a multicolor speckled appearance.

The basecoating composition was that which was detailed in Example I above.

The multicolored speckled, piled texture imparting multiphase coating composition was prepared as detailed below:

Two separate pigment paste dispersions were prepared:

| Paste Premix 1 | |
|---|---|
| nonaqueous polyurethane microparticle dispersion of footnote (5) | 12 grams |
| titanium dioxide pigment paste to footnote (4) | 5 grams |
| Paste Premix 2 | |
| nonaqueous polyurethane microparticle dispersion of footnote (5) | 12 grams |
| carbon black pigment paste of footnote (7) | 5 grams |

After the two paste dispersions were prepared they were combined together followed by the addition of

| | |
|---|---|
| aqueous polyurethane of footnote (1) | 25 grams |
| ISOPAR E | 5 grams |
| polyethylene wax of footnote (8) | 4.0 grams |

The resultant speckled coating composition was spray applied over a metal panel which had been basecoated with the basecoating composition according to Example I, above. The resultant coated panel was baked as set out above in Example I.

The panel had a piled texture and a multicolor speckled appearance.

EXAMPLE III

In this Example a coated substrate was prepared having a piled texture and solid matte colored appearance.

The black basecoating composition which had a total solids content of 15.4 percent was prepared in the following manner:

| Ingredients | Parts by Weight (grams) |
|---|---|
| aqueous polyurethane of footnote (1) | 34.0 |
| BYK 020 | 0.15 |
| PERGOPAK M-3 | 0.85 |
| ethylene glycol monobutyl ether | 10.0 |
| deionized water | 20.0 |
| carbon black pigment paste[10] | 34.0 |

[10]This pigment paste was prepared in the following manner:
A premix was prepared from:
9 grams ethylene glycol monohexyl ether;
5 grams diethylene glycol monobutyl ether;
1.67 grams of TAMOL 731 (25 percent in water) which is an ionic surfactant commercially available from Rohm and Haas;
0.56 grams of SURFONYL TG which is a nonionic surfactant commercially available from Air Products;
57.87 grams of deionized water;
1.2 grams of dimethylethanolamine;
40.9 grams of the aqueous polyurethane utilized in footnote (4), above; and 5 grams of carbon black.
The premix was ground in a steel ball mill to a Hegman grind of 8 and then let down with 20 grams of deionized water.

The black, piled texture imparting multiphase coating composition which had a total solids content of 37.2 percent was formulated in the following manner:

| Ingredients | Parts by Weight (grams) |
|---|---|
| carbon black pigment paste of footnote (10) | 4.0 |
| aqueous polyurethane of footnote (1) | 22.0 |
| polyethylene wax of footnote (8) | 4.0 |
| nonaqueous polyurethane microparticle dispersion of footnote (5) | 25.0 |
| ISOPAR E | 5.0 |

The coated substrate was prepared as has been detailed above in Example I.

The resultant coated substrate had a piled texture and a solid black matte appearance.

EXAMPLE IV

In this Example a coated substrate was prepared in a manner similar to Example I and II, above, except that the aqueous polyurethane in the texture imparting coating composition was replaced with an acrylic latex.

The basecoating composition was that detailed in Example III, above.

The texture imparting multiphase coating composition was prepared as detailed below:

| Ingredients | Parts by Weight (grams) |
|---|---|
| acrylic latex[11] | 44.1 |
| dimethylethanolamine | 1.0 |
| carbon black pigment paste of footnote (10) | 18.1 |
| polyethylene wax of footnote (8) | 8.3 |
| nonaqueous polyurethane microparticle dispersion of footnote (5) | 116.0 |
| ISOPAR E | 14.0 |
| ISOPAR K[12] | 7.0 |

[11]This acrylic latex emulsion is commercially available from Rohm and Haas as RHOPLEX EC-1685.
[12]This aliphatic solvent has a boiling range of 177° C. to 197° C. and is commercially available from Exxon.

The coated substrate was then prepared as has been detailed above in Example III.

EXAMPLE V

In this Example a coated substrate was prepared in a manner similar to Example III except that the nonaqueous polyurethane microparticle dispersion in the texture imparting multiphase composition was replaced with an acrylic nonaqueous microparticle dispersion.

The basecoating composition was that detailed in Example III, above.

The texture imparting multiphase coating composition was prepared as detailed below:

| Ingredients | Parts by Weight (grams) |
|---|---|
| aqueous polyurethane of footnote (1) | 103.0 |
| carbon black pigment paste of footnote (10) | 18.1 |
| polyethylene wax of footnote (8) | 8.3 |
| acrylic nonaqueous microparticle dispersion[13] | 159.0 |

[13]This acrylic nonaqueous microparticle dispersion was prepared at 44 percent solids from 44.91 percent ethyl acrylate, 21.45 percent methyl methacrylate, 19.11 percent hydroxyethyl methacrylate, 7.48 percent of the dispersion stabilizer of footnote (a) of Example I, 4.39 percent glycidyl methacrylate and 2.66 percent methacrylic acid. The solvent blend contained 0.48 percent toluene, 2.33 percent VM&P naptha, 6.03 percent butyl acetate, 27.33 percent ISOPAR E and 63.83 percent heptane.

The coated substrate was then prepared as has been detailed in Example III.

The coated panels prepared in Examples I to V, above were all evaluated for physical properties as is described below.

The Taber Abrasion resistance was determined according to ASTM D 4060-84 using a 500 gram and 1,000 gram weight. As the data below shows, the coatings were unaffected by the CS-10 wheel using a 500 gram weight and instead the Taber wheel suffered severe abrasion (indicated as N/A). A CS-17 wheel using a 1,000 gram weight was required to cause any abrasion to the coating:

| Taber Wheel/Weight | Example I | Example II | Example III | Example IV | Example V |
|---|---|---|---|---|---|
| | (Cycles Before Abrasion Occurs) | | | | |
| CS-10/500 g | N/A | N/A | N/A | N/A | N/A |
| CS-17/1,000 g | 100 | 100 | 100 | 50 | 25 |

All of the coated substrates were also evaluated for:
soap and water spot resistance: One to two drops of soapy water were placed on the coating and allowed to stand for 4 hours. The panels were then rinsed with water and the coating observed for any affect.
water immersion resistance: The panels were subjected to 6 hour immersion in a 42° C. water bath.
naptha resistance: A drop of naphtha was applied to the coating and allowed to stand for 5 minutes. The coating was then observed for softening.
mar resistance: A fingernail was drawn down across the coating and the panel observed for removal of the coating. A "poor" rating means that some of the coating was removed. "Excellent" means the coating was not affected.
appearance of texture: was visually observed.

The results appear below:

| Test | EXAMPLE | | | | |
|---|---|---|---|---|---|
| | I | II | III | IV | V |
| soap and water spot resistance | no effect | no effect | no effect | no effect | no effect |
| naphtha resistance | no effect | no effect | no effect | no effect | no effect |
| water immersion resistance | no effect | no effect | no effect | no effect | no effect |
| mar resistance | excellent | excellent | excellent | excellent | poor |
| appearance of texture | even, suede-like | even, suede-like | even, suede-like | soft and rubbery | brittle and very fine |

What is claimed is:

1. A coating composition comprising: a waterborne film-forming polymer; and an independently agglomerateable, dispersed polymer in a nonaqueous medium which is adapted to provide a textured surface upon spray application onto a substrate, the waterborne film-forming polymer and the independently agglomerateable, dispersed polymer being present in amounts effective to provide that the coating composition is a stable, multiphase composition.

2. A coating composition, comprising:
   (a) a waterborne film-forming polymer; and
   (b) a stable, liquid nonaqueous polymer microparticle dispersion characterized in that the nonaqueous dispersion when independently spray applied is capable of forming discrete, particle agglomerates upon volatilization of its nonaqueous medium, the components (a) and (b) being present in amounts effective to provide that the coating composition is a stable, multiphase composition.

3. The stable multiphase coating composition of claim 1 wherein the aqueous phase is the dispersed phase and the nonaqueous phase is the continuous phase.

4. The stable multiphase coating composition of claim 1 wherein the nonaqueous phase is the dispersed phase and the aqueous phase is the continuous phase.

5. The stable multiphase coating composition of claim 2 wherein the aqueous phase is the dispersed phase and the nonaqueous phase is the continuous phase.

6. The stable multiphase composition of claim 2 wherein the nonaqueous phase is the dispersed phase and the aqueous phase is the continuous phase.

7. The coating composition of claim 2 wherein the composition is adapted to provide, upon drying, a coherent film having a Taber Abrasion resistance of 100 wear cycles per mil using a CS-10 abrasive wheel with a 500 gram weight according to ASTM D 4060-84.

8. The coating composition of claim 2 wherein the waterborne polymer of (a) is an aqueous polyurethane polymer.

9. The coating composition of claim 2 wherein the waterborne polymer is an acrylic latex.

10. The coating composition of claim 2 wherein the nonaqueous dispersion of (b) is a linear polyurethane nonaqueous microparticle dispersion.

11. The coating composition of claim 2 wherein the nonaqueous dispersion of (b) is an acrylic nonaqueous microparticle dispersion.

12. The coating composition of claim 10 wherein the nonaqueous medium of the dispersion is heptane.

13. The coating composition of claim 2 additionally comprising a pigment grind paste.

14. The coating composition of claim 2 wherein the nonaqueous microparticle dispersion is a stable, nonaqueous polyurethane microparticle dispersion characterized in that less than 20 percent of the microparticles have a mean diameter greater than 5 microns, further characterized in that at a total solids content of 60 percent the viscosity is less than 1000 centipoise at 25° C., the polyurethane being prepared from reactants which are substantially free of acrylic polymer and the polyurethane further characterized in that it is substantially free of unreacted polyisocyanate monomer.

15. A coating composition comprising:
   (a) an aqueous polyurethane film-forming polymer; and
   (b) a stable, nonaqueous polyurethane microparticle dispersion characterized in that less than 20 percent of the microparticles have a mean diameter greater than 5 microns, further characterized in that at a total solids content of 60 percent the viscosity is less than 1000 centipoise at 25° C., the polyurethane being prepared from reactants which are substantially free of acrylic polymer and the polyurethane further characterized in that it is substantially free of unreacted polyisocyanate monomer; the components (a) and (b) being present in amounts effective to provide that the coating composition is a stable, multiphase composition.

16. A coating composition comprising:
   (a) a waterborne film-forming polymer; and
   (b) a stable, nonaqueous microparticle dispersion prepared by a method which comprises:
      (i) mixing into a nonaqueous medium a polymerizable component at least 20 percent of which is insoluble in the nonaqueous medium, said polymerizable component comprising at least one polymerizable species;
      (ii) subjecting the mixture of (i) to stress sufficient to particulate it;
      (iii) polymerizing the polymerizable component within each particle under conditions sufficient to produce polymer microparticles stably dispersed in the nonaqueous medium, said polymer microparticles being insoluble in the nonaqueous medium and the nonaqueous medium being substantially free of dissolved polymer; the dispersion further characterized in that less than 20 percent of the polymer microparticles after polymerization have a mean diameter greater than 5 microns, the components (a) and (b) being present in amounts effective to provide that the coating composition is a stable, multiphase composition.

17. The composition of claim 16 wherein the polymerizable component further comprises a dispersant.

18. The composition of claim 16 wherein less than 20 percent of the polymer microparticles have a mean diameter greater than 1 micron.

19. The composition of claim 16 wherein stress is applied by liquid-liquid impingement.

20. The composition of claim 16 wherein the nonaqueous medium contains no more than 30 percent of dissolved polymer.

21. The composition of claim 16 wherein the polymerizable component additionally comprises a hydrocarbon insoluble diluent which is different from the nonaqueous medium.

22. The composition of claim 16 wherein the nonaqueous medium is an aliphatic non-polar solvent.

23. The composition of claim 22 wherein the nonaqueous medium is a saturated aliphatic hydrocarbon having a carbon chain length of from 4 to 30 carbon atoms.

24. The composition of claim 16 wherein the polymerizable component comprises an active hydrogen containing material and a polyisocyanate as polymerizable species.

25. The composition of claim 24 wherein the polymerizable component comprises as the active hydrogen containing material a polyol selected from polyurethane polyols, polyester polyols and polyether polyols.

26. The composition of claim 16 wherein the mean diameter of the polymer microparticles ranges from about 0.05 microns to about 0.5 microns.

27. The composition of claim 16 wherein the dispersion is characterized by the property that when at a total solids content of 60 percent the viscosity is less than 1000 centipoise at 25° C.

28. The composition of claim 20 wherein the nonaqueous medium contains no more than 15 percent of dissolved polymer.

29. The composition of claim 16 wherein the microparticles are crosslinked.

30. The composition of claim 16 wherein the microparticles are uncrosslinked.

31. A method of preparing a coated article having a piled texture comprising:
 (a) applying to a substrate a coating composition comprising:
  (i) a waterborne film-forming polymer; and
  (ii) a stable, liquid nonaqueous polymer microparticle dispersion characterized in that the nonaqueous dispersion when independently applied is capable of forming discrete particle agglomerates upon volatilization of its nonaqueous medium, the components (i) and (ii) being present in amounts effective to provide that the coating composition is a stable multiphase composition; and
 (b) allowing the coating composition to dry.

32. The method of claim 31 wherein a waterborne clear coating composition is applied over the coating composition of step (a) wet-on-wet.

33. The method of claim 31 wherein a waterborne clear coating composition is applied over the coating composition of step (a) wet-on-dry.

34. The method of claim 31 wherein the coating composition of step (a) is solid matte color.

35. The method of claim 31 wherein the coating composition of step (a) is a multicolored speckled composition.

36. The method of claim 35 wherein the speckled composition of step (a) is achieved by the steps:
 A. for each color of the multicolored speckled pattern, corresponding tint base is separately combined with an aliquot of the nonaqueous dispersion of step (ii); and
 B. each of the individually tinted aliquots of nonaqueous dispersion is mixed together to produce the multicolored speckled composition.

37. The method of claim 31 wherein a waterborne, pigmented basecoating composition is applied to the substrate prior to application to the stable, multiphase coating composition of step (a).

38. A coated article according to the method of claim 31.

39. A coated article according to the method of claim 34.

40. A coated article according to the method of claim 35.

41. A coated article according to the method of claim 36.

42. A coated article according to the method of claim 37.

* * * * *